United States Patent
Lin et al.

(10) Patent No.: US 10,171,545 B2
(45) Date of Patent: Jan. 1, 2019

(54) SYSTEM FOR TRANSFERRING REAL-TIME AUDIO/VIDEO STREAM

(71) Applicant: YUAN ZE UNIVERSITY, Taoyuan (TW)

(72) Inventors: Chi-Fang Lin, Hsinchu (TW); Wei-Yu Chen, Taoyuan (TW); Yang-Cheng Chang, Taipei (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 179 days.

(21) Appl. No.: 15/433,382

(22) Filed: Feb. 15, 2017

(65) Prior Publication Data

US 2018/0034885 A1 Feb. 1, 2018

(30) Foreign Application Priority Data

Jul. 29, 2016 (TW) .............................. 105124095 A

(51) Int. Cl.
*H04L 29/06* (2006.01)
*H04L 29/08* (2006.01)

(52) U.S. Cl.
CPC .......... *H04L 65/608* (2013.01); *H04L 65/607* (2013.01); *H04L 67/02* (2013.01); *H04L 67/26* (2013.01); *H04L 67/42* (2013.01)

(58) Field of Classification Search
CPC ..... H04L 65/607; H04L 65/608; H04L 67/02; H04L 67/26; H04L 67/42
See application file for complete search history.

(56) References Cited

U.S. PATENT DOCUMENTS

| 9,332,421 | B2 * | 5/2016 | Keum ..................... H04W 8/22 |
| 2007/0223380 | A1 | 9/2007 | Gilbert et al. |
| 2011/0093617 | A1 * | 4/2011 | Igarashi .......... H04N 21/23406 709/246 |
| 2012/0254456 | A1 | 10/2012 | Visharam et al. |
| 2012/0259946 | A1 * | 10/2012 | Stockhammer ....... H04L 65/105 709/217 |

(Continued)

FOREIGN PATENT DOCUMENTS

| CN | 102968424 A | 3/2013 |
| TW | 201103295 A | 1/2011 |
| TW | 201605230 A | 2/2016 |

*Primary Examiner* — Kostas J Katsikis
(74) *Attorney, Agent, or Firm* — Li & Cai Intellectual Property (USA) Office

(57) ABSTRACT

Disclosed is a system for transferring real-time audio/video stream. The system comprises a mobile device, a server and a client terminal. The mobile device comprises a recording module, a fragmented media data (FMD) codec, a segmented media data (SMD) codec and a wireless communication module. The recording module records an event on the scene and generates a real-time video stream. The FMD codec encodes the real-time video stream into fragmented media data comprising a start fragment information, at least one media fragment and a media fragment (MF) random access point. The SMD codec directly segments the fragmented media data into a plurality of segmented media data, which are a start segment and at least one play segment. The SMD codec automatically and sequentially transmits the segmented media data to the server. Finally, the server pushes the segmented media data to the client terminal for play through a browser.

9 Claims, 3 Drawing Sheets

(56) References Cited

U.S. PATENT DOCUMENTS

| | | | |
|---|---|---|---|
| 2013/0060956 A1* | 3/2013 | Nagaraj | H04N 21/4384 709/231 |
| 2013/0132579 A1* | 5/2013 | Keum | H04W 8/22 709/225 |
| 2013/0148671 A1* | 6/2013 | Dipasquale | H04L 12/6418 370/474 |
| 2014/0032987 A1* | 1/2014 | Nagaraj | H04L 65/604 714/747 |
| 2016/0011923 A1* | 1/2016 | Walker | H04L 65/80 714/49 |
| 2016/0234536 A1* | 8/2016 | Stockhammer | H04L 67/02 |
| 2016/0261665 A1* | 9/2016 | Stockhammer | H04L 65/4069 |
| 2016/0337424 A1* | 11/2016 | Mandyam | H04L 65/4076 |
| 2016/0373324 A1* | 12/2016 | Gholmieh | H04L 65/4076 |
| 2016/0373546 A1* | 12/2016 | Lotfallah | H04L 65/4084 |
| 2017/0041372 A1* | 2/2017 | Hosur | H04N 21/25883 |
| 2017/0063960 A1* | 3/2017 | Stockhammer | H04L 65/607 |
| 2017/0201761 A1* | 7/2017 | Walker | H04N 19/46 |
| 2017/0339415 A1* | 11/2017 | Wang | H04N 19/167 |
| 2017/0347163 A1* | 11/2017 | Wang | G06T 9/00 |
| 2018/0035176 A1* | 2/2018 | Stockhammer | H04L 67/02 |
| 2018/0098242 A1* | 4/2018 | Thienot | H04L 65/4076 |

\* cited by examiner

SYSTEM FOR TRANSFERRING REAL-TIME AUDIO/VIDEO STREAM

BACKGROUND OF THE INVENTION

1. Field of the Invention

The instant disclosure relates to a system for transferring real-time audio/video stream; in particular, to a system for transferring real-time audio/video stream wherein a mobile device can directly process a real-time video stream and then transmit the processed real-time video stream to a client terminal through a server for play.

2. Description of Related Art

Currently, many cities in Taiwan have their emergency operation centers to help the public in case of accident, any emergent event or other problem. For example, people can call the 1999 dedicated line to contact with the emergency operation center. By calling the emergency operation center, people can ask questions about a policy, can report an accident or an emergent event, and can even locate which bus they would like to take.

Recently, mobile devices have become widely used. Thus, when there is an accident or an emergent event, some people use their mobile devices to record the accident or the emergent event at the scene to inform their families and friends. Thus, if the media data of the recorded accident or the emergent event could be provided to the local emergency operation center, it would be better than reporting an accident or an emergent event on the phone.

However, the media data cannot be transmitted to a server until the recording of an accident or an emergent event has been completed. In addition, the media data needs to be processed by the server. After that, a client terminal needs to download the wanted media data from the server for play. The media data can only be transmitted when the recording of an accident or an emergent event has been completed. In addition, it may be slow for the mobile device to upload the obtained media data to the server and also may also be slow for the client terminal to download the wanted media data from the server because of the unstable status of the Internet. Thus, it is actually hard to transmit an audio/video stream, generated when recording an accident or an emergent event at the scene, to a client terminal in real time.

SUMMARY OF THE INVENTION

The instant disclosure provides a system for transferring real-time audio/video stream. The system for transferring real-time audio/video stream comprises a mobile device, a server and a client terminal. The mobile device comprises a recording module, a fragmented media data codec, a segmented media data codec and a wireless communication module. The recording module generates a real-time video stream. The recording module generates a real-time video stream, and encodes the real-time video stream to generate a fragmented media data. The fragmented media data comprises a start fragment information, at least one media fragment and a media fragment random access point. The segmented media data codec divides the fragmented media data to a plurality of segmented media data. The segmented media data has a start segment and at least one play segment. The segmented media data codec transmits the segmented media data to the server through the wireless communication module. The client terminal receives the segmented media data pushed by the server and plays the segmented media data through a browser.

To sum up, by using the system for transferring real-time audio/video stream provided by the instant disclosure, when a user uses his mobile device to record, for example, an accident at the scene, his mobile device can directly process a real-time video stream at the same time, which is generated when recording the accident. Moreover, the mobile device transmits the processed real-time video stream to a server, and the server pushes the processed real-time video stream to a client terminal for play. In other words, even when the recording has not been finished, the mobile device can simultaneously process the real-time video stream generated during the recording and then can transmit the processed real-time video stream to the server. Then, the server can push the processed real-time video stream to the client terminal. In this manner, the transmission of the real-time audio/video stream can be realized.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings. In addition, like reference numbers refer to like elements throughout.

By using the system for transferring real-time audio/video stream provided by the instant disclosure, a user can record by his mobile device an accident at the scene. Then, through a server, a client terminal (e.g. an emergency operation center) can immediately learn of accidents that have happened anywhere and thus can correspondingly react. Some embodiments are provided in the following description for illustrating the system for transferring real-time audio/video stream provided by the instant disclosure.

Figure 1:
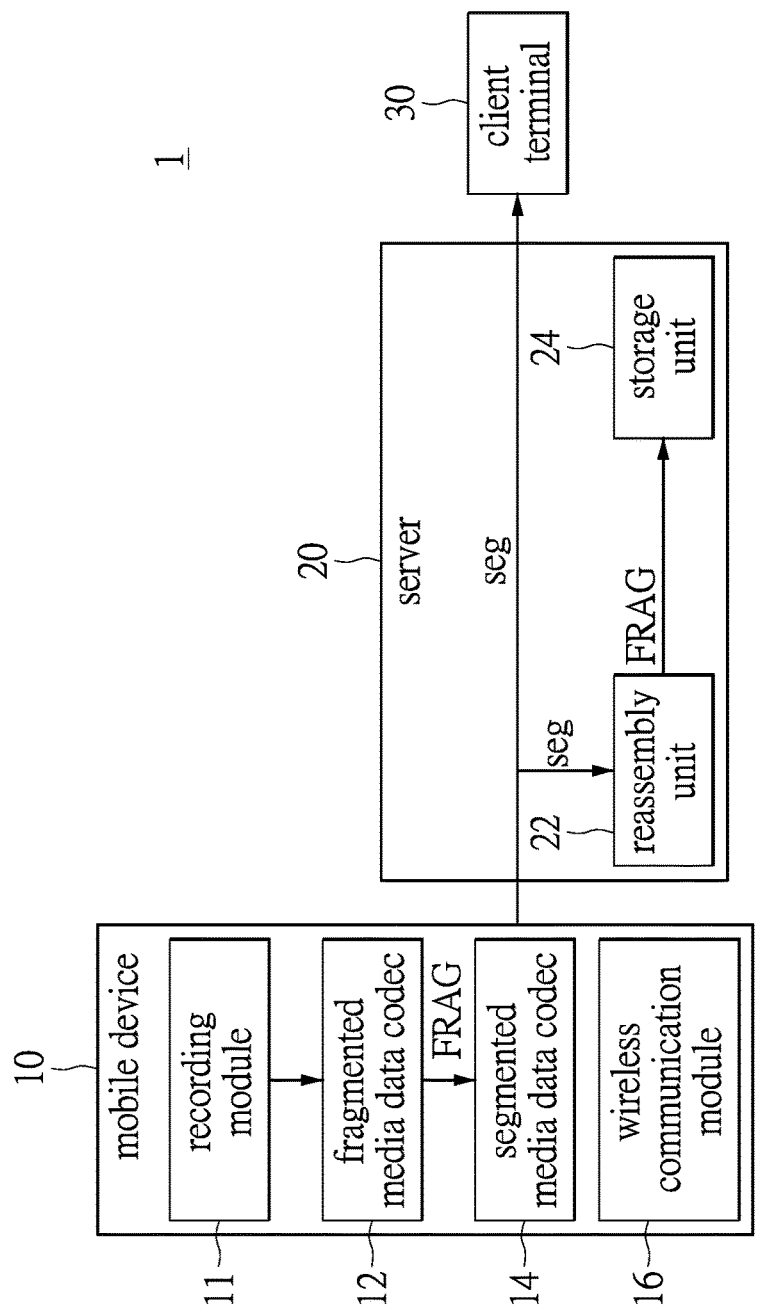
FIG. 1 shows a block diagram of a system for transferring real-time audio/video stream of one embodiment of the instant disclosure.

Referring to FIG. 1, FIG. 1 shows a block diagram of a system for transferring real-time audio/video stream of one embodiment of the instant disclosure. As shown in FIG. 1, the system for transferring real-time audio/video stream 1 comprises a mobile device 10, a server 20 and a client terminal 30. The mobile device 10 comprises a recording module 11, a fragmented media data codec 12, a segmented media data codec 14 and a wireless communication module 16.

A user can use his mobile device 10 to record an event by the recording module 11 at the scene, such as an accident. For example, the recording module 11 can be a video recorder of a smart phone or a tablet. When the recording module 11 is recording an accident, there is a real-time video stream generated. At the same time, the fragmented media data codec 12 is encoding this real-time video stream to generate a plurality of fragmented media data FRAG. The time duration of these fragmented media data FRAG is predetermined. In addition, the fragmented media data FRAG comprises a start fragment information, at least one media fragment and a media fragment random access point. Then, the segmented media data codec 14 directly divides each fragmented media data FRAG to a plurality of segmented media data seg. The time duration of these segmented media data seg is also predetermined, but different from the time duration of the above described fragmented media data FRAG. After that, these segmented media data seg are transmitted to the server 20 through the wireless communication module 16, wherein these segmented media data seg comprise a start segment and at least one play segment. Finally, the server 20 sequentially pushes these segmented media data seg to the client terminal 30, and the client terminal 30 can use its browser to directly play the segmented media data seg.

In this embodiment, the mobile device 10 can be, for example, an Android mobile device, and in this case, the fragmented media data codec 12 and the segmented media data codec 14 can be implemented as the library in the Android operating system, such as the MPEG DASH library. However, this kind of library is not a built-in library in the Android operating system. To make this kind of library able to be adapted to an Android mobile device, the Java Native Interface (JNI) and the Native Development Kit (NDK) need to be used to convert codes, such that the fragmented media data codec 12 and the segmented media data codec 14 can be realized by an Android application. The working principle about how to use the JNI and the NDK to do code conversion for the above described library should be easily understood by those skilled in the art, and thus the relevant details are omitted herein.

To divide the fragmented media data FRAG to a plurality of segmented media data seg, the segmented media data codec 14 directly disconnects the start fragment information and each media fragment of the fragmented media data FRAG to generate a plurality of segmented media data seg. Thus, the time duration of the segmented media data seg is undoubtedly less than the time duration of the fragmented media data FRAG. In addition, the amount of the play segment is equal to the amount of the media fragments of the fragmented media data FRAG. In this embodiment, the time duration of the fragmented media data FRAG is, for example, 15 minutes, and the time duration of the segmented media data seg is, for example, 1 second. However, in practice, the time duration of the fragmented media data FRAG and the time duration of the segmented media data seg can both be designed by a system designer depending on need. Moreover, the data format of the fragmented media data FRAG and the segmented media data seg will be described later.

In this embodiment, the server 20 is only considered a mediator to transmit the segmented media data seg. However, the server 20 comprises a reassembly unit 22 and a storage unit 24 as shown in FIG. 1. Specifically speaking, at the same time as the server 20 is pushing the segmented media data seg to the client terminal 30, the server 20 is also reassembling the segmented media data seg to again obtain the fragmented media data FRAG. Then, the server 20 stores the obtained fragmented media data FRAG in the storage unit 24 as a source for playback.

The segmented media data seg need to be reassembled as the fragmented media data FRAG before being stored because it takes more memories to write in and read out small pieces of media data, such as the segmented media data seg. On the other hand, the memory can be used more efficiently to store the larger pieces of media data, such as the fragmented media data FRAG (the data size of the segmented media data seg is smaller than the data size of the fragmented media data FRAG).

In addition, when the server 20 pushes the segmented media data seg to the client terminal 30, the firewall may block it. Thus, in this embodiment, the server 20 pushes the segmented media data seg to the client terminal 30 based on the HTTP/2 protocol, but not based on the Real Time Streaming Protocol (RSTP) and the Real-time Transport Protocol (RTP). In this manner, when the server 20 pushes the segmented media data seg to the client terminal 30, the firewall will not block it and the server 20 can push the segmented media data seg to the client terminal 30 within a short time.

Moreover, in this embodiment, the server 20 uses the HTTP/2 Server Push (SP) to push the segmented media data seg to the client terminal 30. Thus, the server 20 can push the segmented media data seg directly to the client terminal 30 without the client terminal 30 asking for the resource. Specifically speaking, the HTTP/2 Server Push is great for continually updating a big amount of data, such as the transmission of a video stream. By using the HTTP/2 Server Push, when the server 20, for the first time, receives a data request message from the client terminal 30, it can transmit all the static files (e.g. JavaScript or the like) to the client terminal 30. Thus, the client terminal 30 does not need to send the data request message every time it needs to request for different static files. Thereby, the connection between the server 20 and the client terminal 30 can be more stable and the data transmission delay can be decreased.

Figure 2:
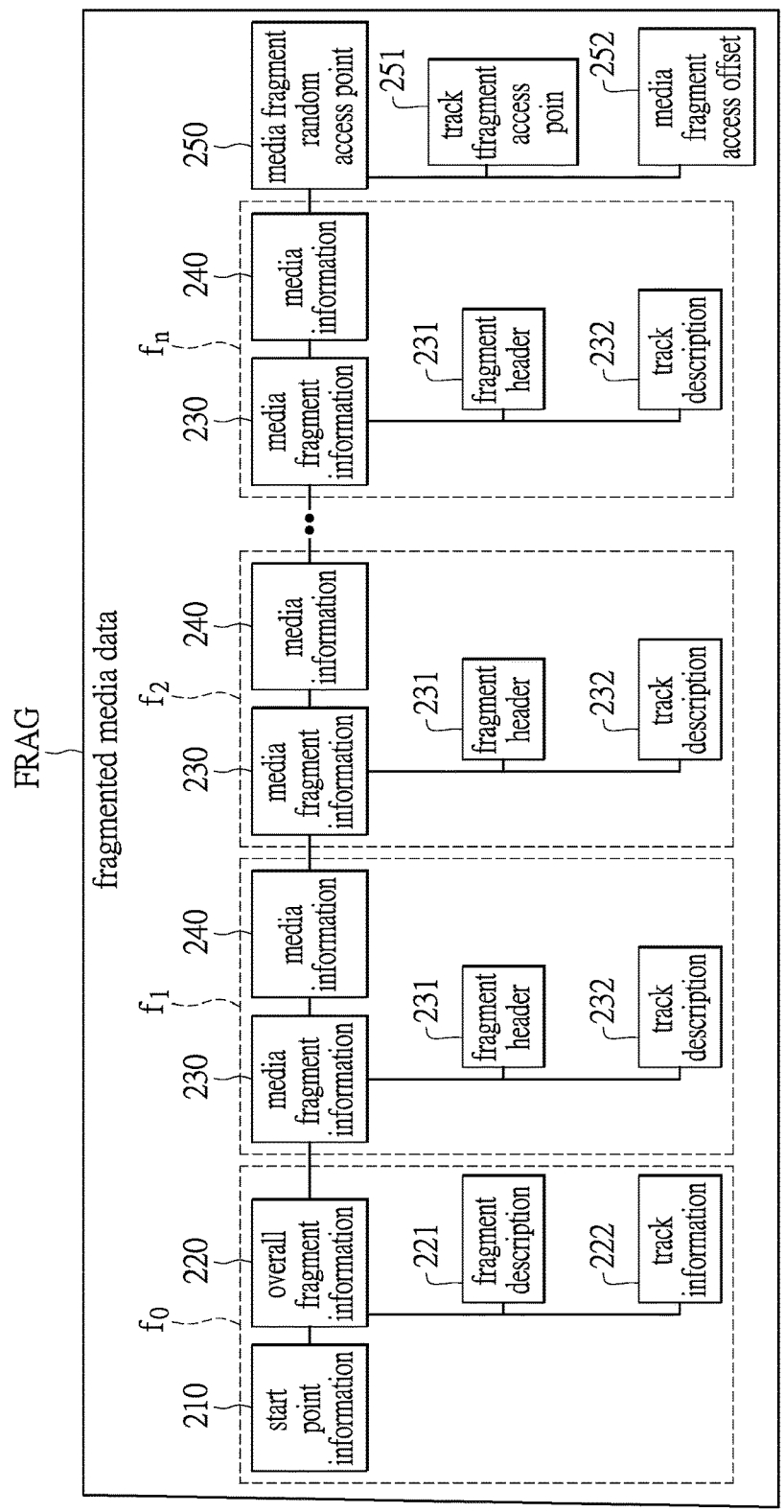
FIG. 2 is a schematic diagram showing the data format of the fragmented media data in one embodiment of the instant disclosure.
Figure 3:
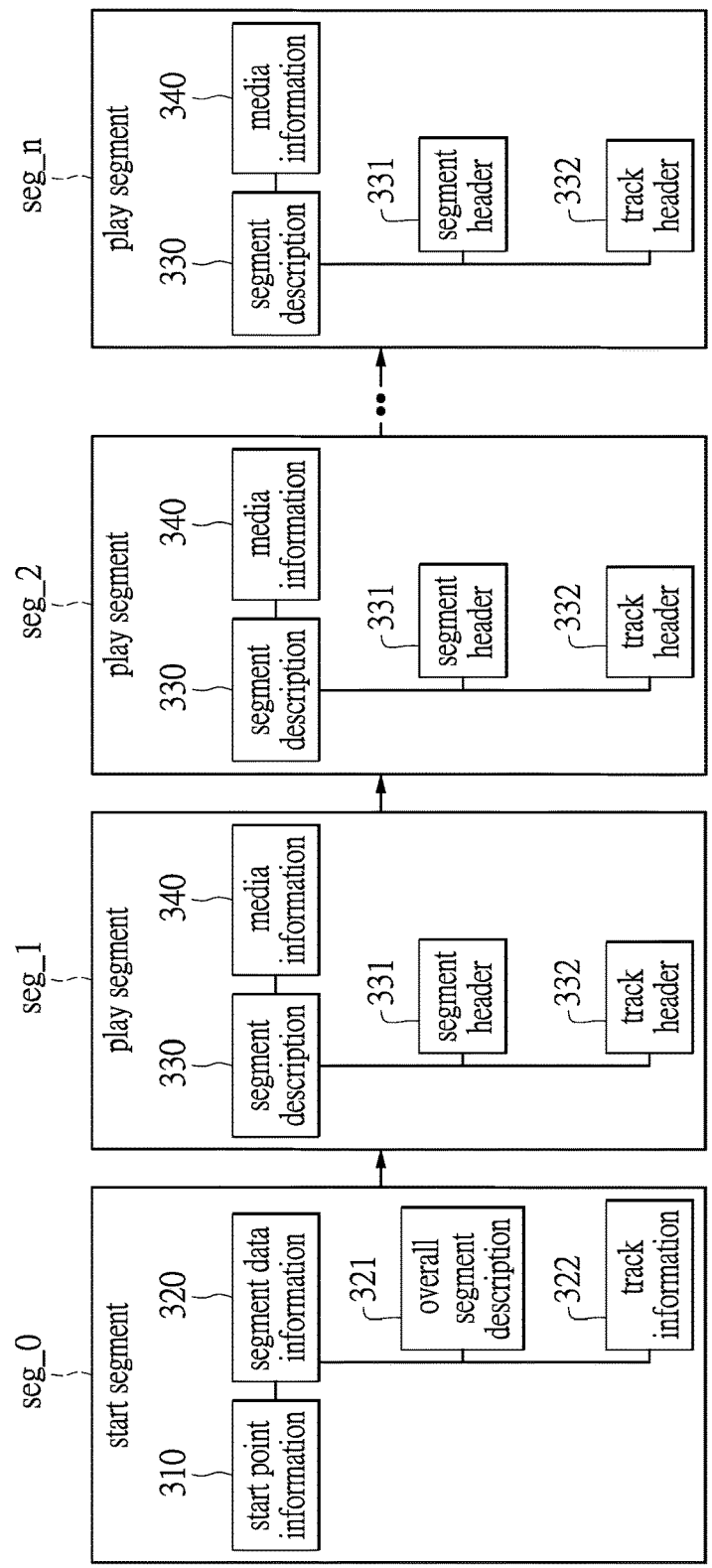
FIG. 3 is a schematic diagram showing the data format of the segmented media data in one embodiment of the instant disclosure.

The data format of the fragmented media data FRAG and the segmented media data seg is illustrated in the following description, and accordingly the major working principle of the system for transferring real-time audio/video stream 1 provided in this embodiment is further illustrated. Referring to FIG. 2 and FIG. 3, FIG. 2 is a schematic diagram showing the data format of the fragmented media data in one embodiment of the instant disclosure, and FIG. 3 is a schematic diagram showing the data format of the segmented media data in one embodiment of the instant disclosure.

The data format of the fragmented media data FRAG in this embodiment is the Fragmented MPEG-4, which is based on the standard data format ISO/IEC 14496-1:2001 or the standard data format ISO/IEC 14496-14:2003. In addition, the data format of the segmented media data seg in this embodiment is the Segmented MPEG-4, which is based on the standard data format ISO/IEC 14496-1:2001 or the standard data format ISO/IEC 14496-14:2003.

The fragmented media data FRAG shown in FIG. 2 comprises a start fragment information f0, at least one media fragment f1, f2 . . . fn and a media fragment random access point 250. The "n" is an integer greater than 0, and indicates the number of the media fragments. It should be noted that, the start fragment information f0, the media fragments f1, f2 . . . fn and a media fragment random access point 250 are packaged as a fragmented media data FRAG and have not yet been disconnected.

Again referring to FIG. 2, the start fragment information f0 comprises a start point information 210 and an overall fragment information 220. The start point information 210 provides the file execution information of the media data, such as the support application information of the media data. The start point information 210 can be implemented as the file type and compatibility (ftyp) of the MP4 data format. The overall fragment information 220 comprises a fragment description 221 and a track information 222, and records the metadata information of the media data. The overall fragment information 220 can be implemented as the container for all the metadata (moov) of the MP4 data format. The fragment description 221 provides the characteristic information of the media data, such as establishment time, time length and the like, and the fragment description 221 can be implemented as the movie header and overall declarations (mvhd) of the MP4 data format. In addition, the track information 222 provides the overall track information of the media data, such as audio frequency, subtitles and the like, and the track information 222 can be implemented as the container for an individual track or stream (trak) of the MP4 data format.

The media fragments f1, f2, . . . , fn record the contents of the media data. Each media fragment f1, f2, . . . , fn comprises a media fragment information 230 and a media information 240. The media fragment information 230 records the fragment description information of the media data, and the media fragment information 230 can be implemented as the movie fragment (moof) of the MP4 data format. Specifically speaking, the media fragment information 230 comprises a fragment header 231 and a track description 232. The fragment header 231 provides the fragment characteristic information, and can be implemented as the movie fragment header (mfhd) of the MP4 data format. The track description 232 provides the single track information, and can be implemented as the track fragment (traf) of the MP4 data format. Moreover, the media information 240 records the media information that is to play, and the media information 240 can be implemented as the media data container (mdat) of the MP4 data format.

The media fragment random access point 250 follows the last media fragment fn to indicate the termination of the entire fragmented media data FRAG. The media fragment random access point 250 can be implemented as the movie fragment random access (mfra) of the MP4 data format. Again referring to FIG. 2, the media fragment random access point 250 comprises a track fragment access point 251 and a media fragment access offset 252. The track fragment access point 251 provides the end point of the track, and the track fragment access point 251 can be implemented as the track fragment random access (tfra) of the MP4 data format. The media fragment access offset 252 records the offset of the media fragments f1, f2, . . . , fn, and the media fragment access offset 252 can be implemented as the movie fragment random access offset (mfro) of the MP4 data format.

As described, the segmented media data codec 14 directly cuts the fragmented media data FRAG into a plurality of segmented media data seg, such as the segmented media data seg_0, seg_1, . . . , seg_n shown in FIG. 3. In FIG. 3, the first segmented media data is the segmented media data seg_0, and the following segmented media data are the play segments seg_1, . . . , seg_n.

Specifically speaking, the segmented media data seg_0 comprises a start point information 310 and a segment data information 320. The start point information 310 provides the file execution information of the media data, such as the application that can play the media data. The start point information 310 can be implemented as the file type and compatibility (ftyp) of the MP4 data format. The segment data information 320 provides the metadata information of the media data, and can be implemented as the container for all the metadata (moov) of the MP4 data format. Moreover, the segment data information 320 comprises an overall segment description 321 and a track information 322. The segment description 321 provides the media characteristic information of the media data, such as establishment time, time length and the like, and can be implemented as the movie header and overall declarations (mvhd) of the MP4 data format. The track information 322 provides the overall track information of the media data, such as audio frequency, subtitles and the like, and can be implemented as the container for an individual track or stream (trak) of the MP4 data format.

The play segments seg_1, . . . , seg_n record contents of the media data. As shown in FIG. 3, the play segments seg_1, . . . , seg_n comprise a segment description 330 and a media information. The segment description 330 provides the detailed information of the segment of the media data, and can be implemented as the moof of the MP4 data format. Specifically speaking, the segment description 330 comprises a segment header 331 and a track header 332. The segment header 331 provides the segment characteristic information, and can be implemented as the mfhd of the MP4 data format. The track header 332 provides the single track information, specifically, the header information of the single track, and the track header 332 can be implemented as the track fragment header (tfhd) of the MP4 data format. Moreover, the media information 340 provides the media data that can be played, and the media information 340 can be implemented as the mdat of the MP4 data format.

In this embodiment, during encoding a real-time video stream to generate a fragmented media data FRAG, and simply cutting the fragmented media data FRAG to generate smaller pieces of segmented media data seg, the data transformation is simple and quick. Thus, the system for transferring real-time audio/video stream 1 does not need to take much time to process the real-time video stream.

Referring to FIG. 1, FIG. 2 and FIG. 3, the browser of the client terminal 30 can play the segmented media data by using an HTML5 video tag. When the client terminal 30 receives the segmented media data seg pushed by the server 20, the client terminal 30 uses a Media Source Application Programming Interface (API) to process the segmented media data seg, such that the processed segmented media data seg can be directly played by the HTML5 browser of the client terminal 30. It is worth mentioning that, again referring to the data format of the segmented media data seg in FIG. 3, when the browser of the client terminal 30 loads in the start segment seg_0 and at least one play segment seg_1 of the processed segmented media data seg, the browser of the client terminal 30 can start playing them, and it is unnecessary to wait for all play segments seg_1, . . . , seg_n to be loaded in.

As described, in this embodiment, the time duration of the fragmented media data FRAG is 15 minutes, and the time duration of the segmented media data seg is 1 second. That is, when the browser of the client terminal 30 loads in the start segment seg_0 and at least one play segment seg_1 of the processed segmented media data seg, it can play is video.

In this manner, as long as the browser of the client terminal 30 can sequentially load in and play the play segments seg_1~seg_n of which the time duration is 1 second, the video stream taken at the scene can be almost played real-time by the browser of the client terminal 30. Additionally, because the time duration of the segmented media data seg is much smaller than the time duration of the fragmented media data FRAG, it will be easier to match the video transmission and the audio transmission.

Briefly, in the system for transferring real-time audio/video stream 1, the video stream taken by the mobile device 10, in a segmented media data format, can be quickly transmitted to and played by the HTML5 browser of the client terminal 30. There is no additional video player needed to be installed in the client terminal 30.

Additionally, the flow of the Internet varies with time, and thus sometimes the transmission of the media data may be delayed or even interrupted. In one embodiment, the client terminal 30 further comprises a buffer (not shown) to temporarily store the reassembled fragmented media data FRAG. According to the variation of the flow of the Internet, the server 20 automatically adjusts the time duration within which the buffer stores the reassembled fragmented media data FRAG. In this manner, the client terminal 30 can playback the video/audio which was not played well.

In another embodiment, the mobile device 10 further comprises a position sensor (not shown), such as the Global Positioning System (GPS), to locate the mobile device 10 and correspondingly generate a geographical information. The fragmented media data codec 12 encodes a real-time video stream and the geographical information to generate a plurality of fragmented media data FRAG. Specifically speaking, the geographical information obtained by the position sensor is written in the fragment description 221 of the overall fragment information 220 of the start fragment information f0. As described, the fragment description 221 can be implemented as the movie header and overall declarations (mvhd) of the MP4 data format. Thus, when the browser of the client terminal 30 loads the start segment seg_0 of the segmented media data seg and at least one play segment seg_1 of the segmented media data seg for play, the client terminal 30 can immediately and precisely learn where the recorded event is happening.

In still another embodiment, a user can use his mobile device 10 to set a weight information for each recorded video stream according to the type of a recorded event. For example, the recorded event may be about a traffic accident, the weather damage or the like. The weight information can be described as 0~9 to indicate the degree of the damage and the degree of the emergency of the event, where a larger weight information indicates a more emergent event or more damage resulting from an event. The fragmented media data codec 12 encodes a real-time video stream and the weight information to generate a plurality of fragmented media data FRAG, and the weight information set by the user is written in the start fragment information f0 of the fragmented media data FRAG. Specifically speaking, the weight information set by the user is written in the fragment description 221 of the overall fragment information 220 of the start fragment information f0. As described, the fragment description 221 can be implemented as the movie header and overall declarations (mvhd) of the MP4 data format.

When the client terminal 30 simultaneously loads in many groups of the start segment seg_0 and the play segment seg_1 of the segmented media data seg generated by different mobile devices 10, the client terminal 30 determines a playing sequence for these groups of segmented media data seg according to their weight information. After that, the client terminal 30 chooses the first group of segmented media data seg to play according to the playing sequence. Moreover, the client terminal 30 can learn what the recorded event is about as soon as the segmented media data seg is played.

As mentioned, the server 20 uses the HTTP/2 Server Push (SP) to push the segmented media data seg to the client terminal 30. In this manner, the server 20 can push the segmented media data seg directly to the client terminal 30 without the client terminal 30 asking for the resource, such that the data transmission delay can be avoided and the connection between the server 20 and the client device 30 can be more stable. However, before the first time of the server 20 to push the segmented media data seg to the client terminal 30, the client terminal 30 needs to communicate with the server 20. The communication between the client terminal 30 and the server 20 in the system for transferring real-time audio/video stream 1 is illustrated in the following description.

In this embodiment, when the segmented media data codec 14 transmits the segmented media data seg to the server 20, the server 20 starts to monitor the client terminal 30, and then determines whether the connection between the client terminal 30 and the server 20 is built, by monitoring whether there is a connection request sent by the client terminal 30. After the server 20 determines that the connection between the client terminal 30 and the server 20 is built, the server 20 keeps monitoring the client terminal 30, and then determines whether to push the segmented media data seg generated by the segmented media data codec 14 to the client terminal 30, by monitoring whether there is a data request message send by the client terminal 30. Finally, after the server 20 pushes the segmented media data seg generated by the segmented media data codec 14 to the client terminal 30, the server 20 keeps monitoring the client terminal 30, and then determines whether to stop pushing the segmented media data seg generated by the segmented media data codec 14 to the client terminal 30, by monitoring whether there is a decline message send by the client terminal 30.

The server 20 keeps pushing the segmented media data seg to the client terminal 30 until the client terminal 30 sends a decline message to disconnect the connection between the client terminal 30 and the server 20. In this manner, the connection between the client terminal 30 and the server 20 can be stably maintained and the server 20 does not need to process different data request messages. Thus, it helps to continually update a large amount of data, such as the transmission of a video stream. It is worth mentioning that, the client terminal 30 and the server 20 can communicate based on the WebSocket protocol.

To sum up, in the system for transferring real-time audio/video stream provided by the instant disclosure, a mobile device can directly process a real-time video stream, and then can transmit the processed real-time video stream to a client terminal through a server for play. The system for transferring real-time audio/video stream provided by the instant disclosure also has the following advantages.

The real-time audio/video stream can be processed by the mobile device to generate a plurality of segmented media data, wherein each segmented media data can be directly played by the browser of the client terminal. Thus, the browser of the client terminal does not need not to wait for all segmented media data to be loaded in. Also, there is no need to have an additional video player installed. Moreover, the server pushes the segmented media data to the client terminal based on the HTTP/2 protocol, so the firewall will not block it when the server pushes the segmented media data to the client terminal, and the server can push the segmented media data to the client terminal within a short time.

In addition, in the system for transferring real-time audio/video stream provided by the instant disclosure, the server reassembles a plurality of segmented media data to generate a fragmented media data and then stores this fragmented media data. In this manner, the memory of the buffer of the server can be used more efficiently, and the stored fragmented media data can be a source for playback.

Furthermore, by using the system for transferring real-time audio/video stream provided by the instant disclosure, the geographical information and the weight information related to the recorded event can be written in the segmented media data. Thereby, the client terminal can immediately and precisely learn where the recorded event is happening, or can obtain a playing sequence according to the degree of the damage and the degree of the emergency of the recorded events.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A system for transferring real-time audio/video stream, comprising:
    a mobile device, comprising:
    a video recorder, generating a real-time video stream;
    a fragmented media data codec, encoding the real-time video stream to generate a fragmented media data, wherein the fragmented media data comprises a start fragment information, at least one media fragment and a media fragment random access point;
    a segmented media data codec, dividing the fragmented media data to a plurality of segmented media data, wherein the segmented media data has a start segment and at least one play segment; and
    a wireless communication interface;
    a server, the segmented media data codec transmitting the segmented media data to the server through the wireless communication interface;
    a client terminal, receiving the segmented media data pushed by the server and playing the segmented media data through a browser; and
    wherein the mobile device receives a weight information, when the fragmented media data codec encodes the real-time video stream to generate the fragmented media data, the weight information is written in the start fragment information, the client terminal determines a playing sequence for all the segmented media data according to their weight information, and plays these segmented media data according to the playing sequence.

2. The system for transferring real-time audio/video stream according to claim 1, wherein the server comprises a reassembler and a storage unit, when the server pushes the segmented media data to the client terminal, the reassembler reassembles the segmented media data to again obtain the fragmented media data and stores the fragmented media data in the storage unit.

3. The system for transferring real-time audio/video stream according to claim 1, wherein the server pushes the segmented media data to the client terminal based on the HTTP/2 protocol.

4. The system for transferring real-time audio/video stream according to claim 1, wherein the client terminal executes a media source application to process the segmented media data, and uses the browser to load in and play the start segment and at least one play segment of the segmented media data by using an HTML5 video tag.

5. The system for transferring real-time audio/video stream according to claim 1, wherein the client terminal comprises a buffer, the buffer temporarily stores the segmented media data, and the server automatically adjusts a time duration when the segmented media data is stored by the buffer according to the flow of the Internet.

6. The system for transferring real-time audio/video stream according to claim 1, wherein the mobile device further comprises a position sensor to locate the mobile device and correspondingly generate a geographical information, wherein when the fragmented media data codec encodes the real-time video stream to generate the fragmented media data, the geographical information is written in the start fragment information.

7. The system for transferring real-time audio/video stream according to claim 1, wherein when the segmented media data codec transmits the segmented media data to the server, the server monitors the client terminal to know whether a connection request is sent by the client terminal and to accordingly determine whether to build a connection with the client terminal.

8. The system for transferring real-time audio/video stream according to claim 7, wherein after the client terminal is connected with the server, the server keeps monitoring the client terminal to know whether a data request message is sent by the client terminal and to accordingly determine whether to push the segmented media data to the client terminal.

9. The system for transferring real-time audio/video stream according to claim 8, wherein after the server pushes the segmented media data to the client terminal, the server keeps monitoring the client terminal to know whether a decline message is sent by the client terminal and to accordingly determine whether to stop pushing the segmented media data to the client terminal.

* * * * *